US012374198B2

(12) United States Patent
Luu et al.

(10) Patent No.: US 12,374,198 B2
(45) Date of Patent: Jul. 29, 2025

(54) MONITORED AUDIO-BASED EVACUATION ROUTES

(71) Applicant: AT&T Intellectual Property I, L.P., Atlanta, GA (US)

(72) Inventors: Adrianne Luu, Atlanta, GA (US); Robert Moton, Jr., Alpharetta, GA (US); Ryan Schaub, Berkeley Lake, GA (US); Timothy Knezevich, Mentor, OH (US); Barrett Kreiner, Woodstock, GA (US); Wei Wang, Harrison, NJ (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 404 days.

(21) Appl. No.: 17/931,370

(22) Filed: Sep. 12, 2022

(65) Prior Publication Data

US 2024/0087431 A1 Mar. 14, 2024

(51) Int. Cl.
*G08B 3/10* (2006.01)

(52) U.S. Cl.
CPC .................................. *G08B 3/1008* (2013.01)

(58) Field of Classification Search
CPC .............................. G08B 3/1008; G08B 7/066
See application file for complete search history.

(56) References Cited

U.S. PATENT DOCUMENTS

2023/0009081 A1* 1/2023 Paripally ................ G06V 40/10
2023/0274625 A1* 8/2023 Farrash ................ G08B 27/005 340/506
2023/0290233 A1* 9/2023 Nagale ................... G08B 25/14

* cited by examiner

*Primary Examiner* — Joseph H Feild
*Assistant Examiner* — Sharmin Akhter
(74) *Attorney, Agent, or Firm* — Guntin & Gust, PLC; Mark Wilinski

(57) ABSTRACT

The disclosed technology is directed towards providing guidance, e.g., point-to-point audio guidance, along an evacuation route. The presence of occupant(s) within a structure/area is monitored. If an evacuation event occurs, an evacuation route is determined for each occupant based on their current monitored starting location. Guidance is output, e.g., by various output devices along the evacuation route, which can be the safety monitors that monitor occupant presence, to guide each occupant from point-to-point along the evacuation route. For example, one monitor can be configured to hand off guidance responsibility to a next monitor along the evacuation route. The guidance can be customized for each known occupant based on their recognized features, or can be directed generally to an unknown occupant. Status information of the occupants can be provided to other occupants and to a responding entity. A responding entity can also be given directional guidance.

20 Claims, 15 Drawing Sheets

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Occupant ID | Voice Print Data | Facial Print Data | Status |
|---|---|---|---|---|
| 1 Elm St. ⋮ | Jen | xxxx | aaaa | present |
| | Ed | xxxy | bbbb | present |
| | unknown | ? | ? | ----- |

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Occupant ID / Closest Monitor | Voice Print Data | Facial Print Data | Status |
|---|---|---|---|---|
| 1 Elm St. ⋮ | Jen / 1 | xxxx | aaaa | present |
| | Ed / 2 | xxxy | bbbb | present |
| | unknown | ? | ? | ----- |

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Occupant ID / Closest Monitor | Voice Print Data | Facial Print Data | Status |
|---|---|---|---|---|
| 1 Elm St. ⋮ | Jen / 1 | xxxx | aaaa | present |
| | Ed / 2 | xxxy | bbbb | present |
| | unknown | ? | ? | ----- |

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Occupant ID / Closest Monitor | Voice Print Data | Facial Print Data | Status |
|---|---|---|---|---|
| 1 Elm St. ⋮ | Jen / 1 | xxxx | aaaa | present |
| | Ed / 2 | xxxy | bbbb | present |
| | unknown | ? | ? | ----- |

evacuation data store 104

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Occupant ID / Closest Monitor | Voice Print Data | Facial Print Data | Status |
|---|---|---|---|---|
| 1 Elm St. ⋮ | Jen / 1 | xxxx | aaaa | present |
| | Ed / 2 | xxxy | bbbb | exited |
| | unknown | ? | ? | ---- |

| Address | Safety Monitor ID | Status | Handoff Monitor | Backup Monitor |
|---|---|---|---|---|
| 1 Elm St. ⋮ | 1 / master bedroom | active | 2 | 2 |
| | 2 / main hall | active | 3 | 2 |
| | 3 / entry hall | active | 4 | 2 |
| | 4 / front door | active | none | 5 |

| Address | Occupant ID / Closest Monitor | Voice Print Data | Facial Print Data | Status |
|---|---|---|---|---|
| 1 Elm St. ⋮ | Jen / 1 | xxxx | aaaa | present |
| | Ed / 2 | xxxy | bbbb | present |
| | unknown | ? | ? | ----- |

| Address | Safety Monitor ID | Status | Handoff Monitor | Backup Monitor |
|---|---|---|---|---|
| 1 Elm St. ⋮ | 1 / master bedroom | active | 2 | |
| | 2 / main hall | active | 3 | |
| | 3 / entry hall | active | 4 | |
| | 4 / front door | active | none | |

| Address | Occupant ID / Closest Monitor | Voice Print Data | Facial Print Data | Status |
|---|---|---|---|---|
| 1 Elm St. ⋮ | Jen / 1 | xxxx | aaaa | present |
| | Ed / 2 | xxxy | bbbb | exited |
| | unknown | ? | ? | present |

MONITORED AUDIO-BASED EVACUATION ROUTES

TECHNICAL FIELD

The subject application relates to the guiding users along points of an evacuation route, and related embodiments.

BACKGROUND

In the event of an emergency that requires evacuation of a structure, e.g., a particular area, occupants of the area may not easily be able to determine an evacuation route. This particularly may be the case, for example, in the case of a fire or other event in which the occupants may not have good visibility in the area.

Further, occupants sometimes may not be familiar with their current environment and/or may experience panic and not use good reasoning in deciding on an evacuation route. Still further, an occupant may know of an evacuation route and act accordingly, only to find out that the chosen evacuation route is unsafe or blocked.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
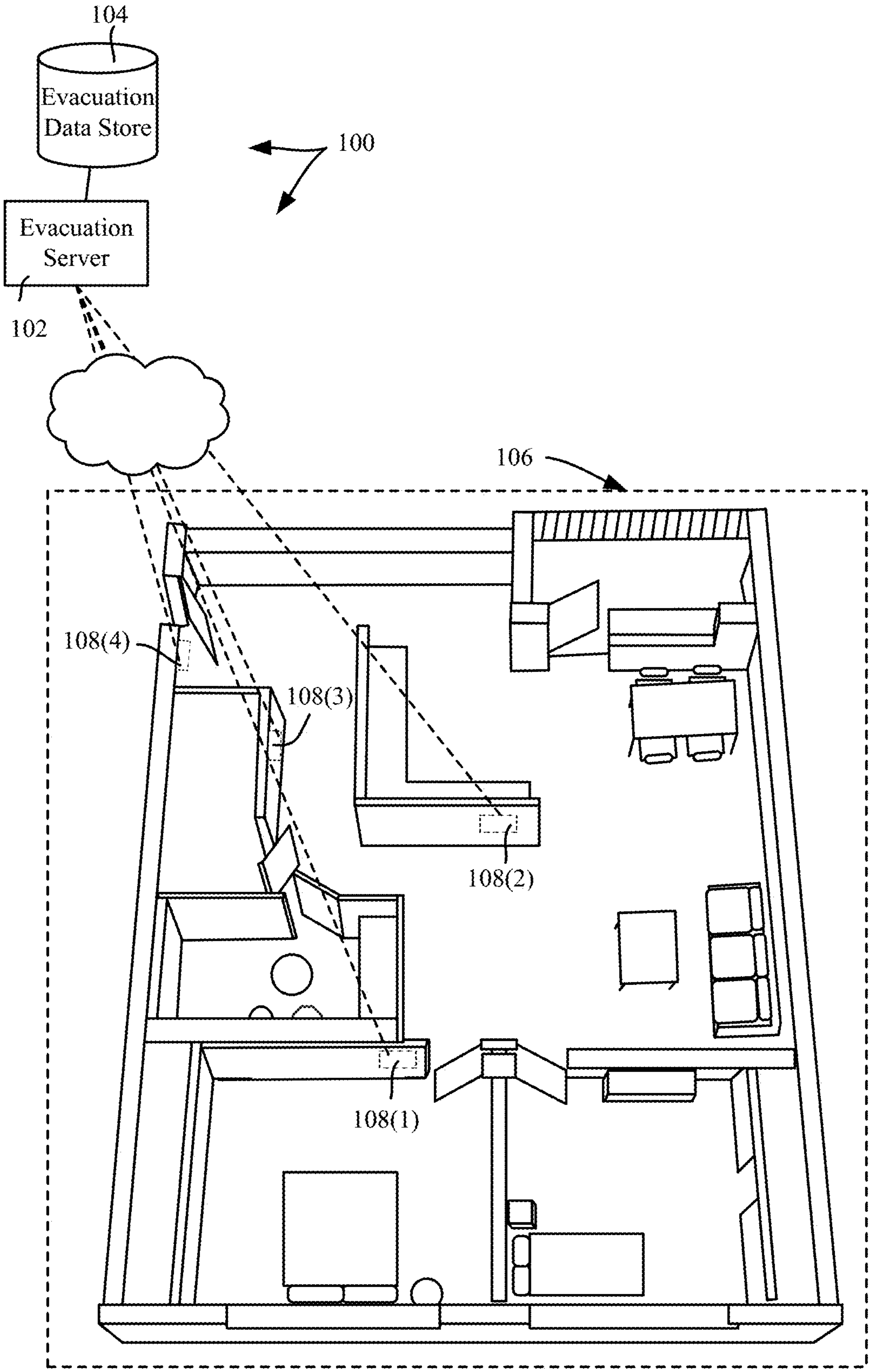
FIG. 1 is a block diagram of an example system and example representation of a structure equipped with safety monitors to assist in evacuation, in accordance with various aspects and embodiments of the subject disclosure.

The technology described herein is generally directed towards establishment of and execution of evacuation routes that may guide occupants of a structure, such as a home, business, office building, stadium and so forth, to a safe exit in the event of an emergency. The guidance can be provided via personalized audio directions that are provided to occupants. The technology described herein also includes tracking and communication of the evacuation status of both known and unknown occupants.

Thus, in the event of an emergency that requires evacuation of a structure, such as corresponding to a particular area, occupants of the structure can be give guidance in determining a route to follow to perform the evacuation. The technology is suited for situations in which the occupants may not have good visibility in the area.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example architecture/system 100 comprising an evacuation server 102 and evacuation data store (e.g., database) 104. As described herein, the evacuation server 102, based on information in the evacuation data store 104, couples to safety monitors to perform evacuation-related operations.

In general, an evacuation area may be defined, such as based on the interior of a home or other structure, whether a single floor or multiple floor area. As represented in FIG. 1, an evacuation area 106 is equipped with one or more safety monitors; four such safety monitors 108(1)-108(4) are shown in the example of FIG. 1, however a different number may be present for an evacuation area. For example, a small home may have less safety monitors than a large home, whereas a business such as an office building or warehouse may have many hundreds of or more safety monitors, possibly mounted near sprinkler heads of a fire sprinkler system.

Note that for purposes of description, an exemplary embodiment is presented in this disclosure describing the evacuation of a structure represented by a home environment as an evacuation area. However, the solution presented may apply to the evacuation of other structures/areas as well.

Example safety monitors 108(1)-108(4) may be equipped with a speaker, an evacuation application program, motion sensors, cameras (e.g., video, depth and/or infrared) environmental sensors (such as heat, carbon monoxide, air quality, smoke, and/or other sensors); not all such sensors may be present in a given safety monitor assembly, and indeed, a safety monitor can couple with existing sensors that are capable of communicating/signaling. The example safety monitors 108(1)-108(4) (depicted as small dashed blocks, which are not intended to convey any relative size data in the drawings) include communications capability via a network to the evacuation server 102 (either on-site or remote via the network). The safety monitors safety monitors 108(1)-108(4) also may be equipped with alerting mechanisms such as lights and sirens.

Figure 2:
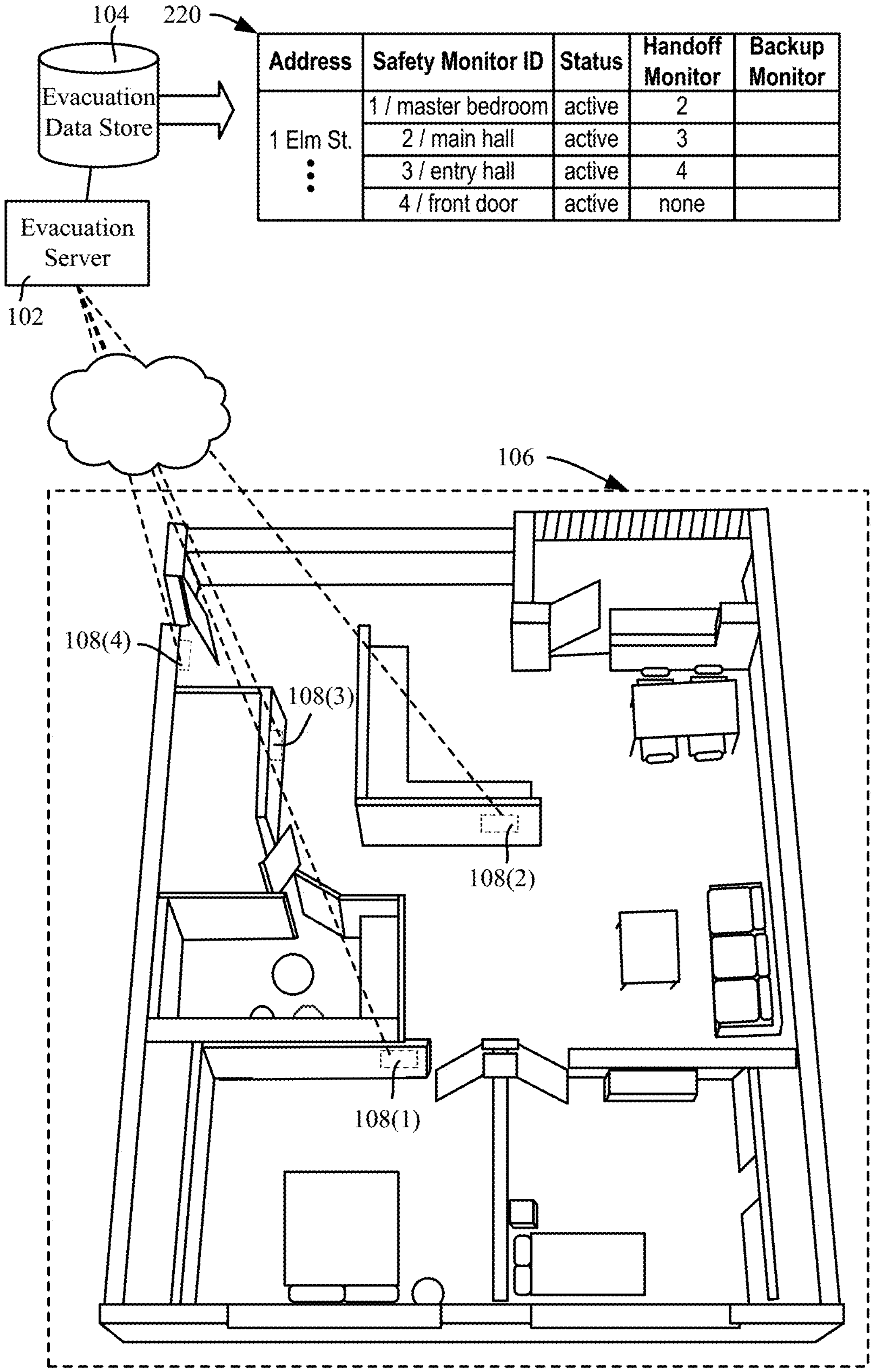
FIG. 2 is a block diagram of an example system, example representation and example evacuation data structure, in accordance with various aspects and embodiments of the subject disclosure.

Upon installation and activation, each safety monitor may be registered in the evacuation data store 104, such as shown via the data structure (e.g., record) 220 of FIG. 2. Each monitor may have a unique electronic identifier (ID), which may be used for the registration. Each monitor may perform self-diagnostics, and periodically report its status to the data store 104. A location tag may also be assigned to each safety monitor, denoting its location within the area, such as "kitchen", "hallway", and so forth as shown in the example data structure 220 of FIG. 2. A physical address (e.g., 1 Elm St. . . . ) or other location identifier (e.g., GPS coordinates) may also be stored for the safety monitors 108(1)-108(4).

Figure 3:
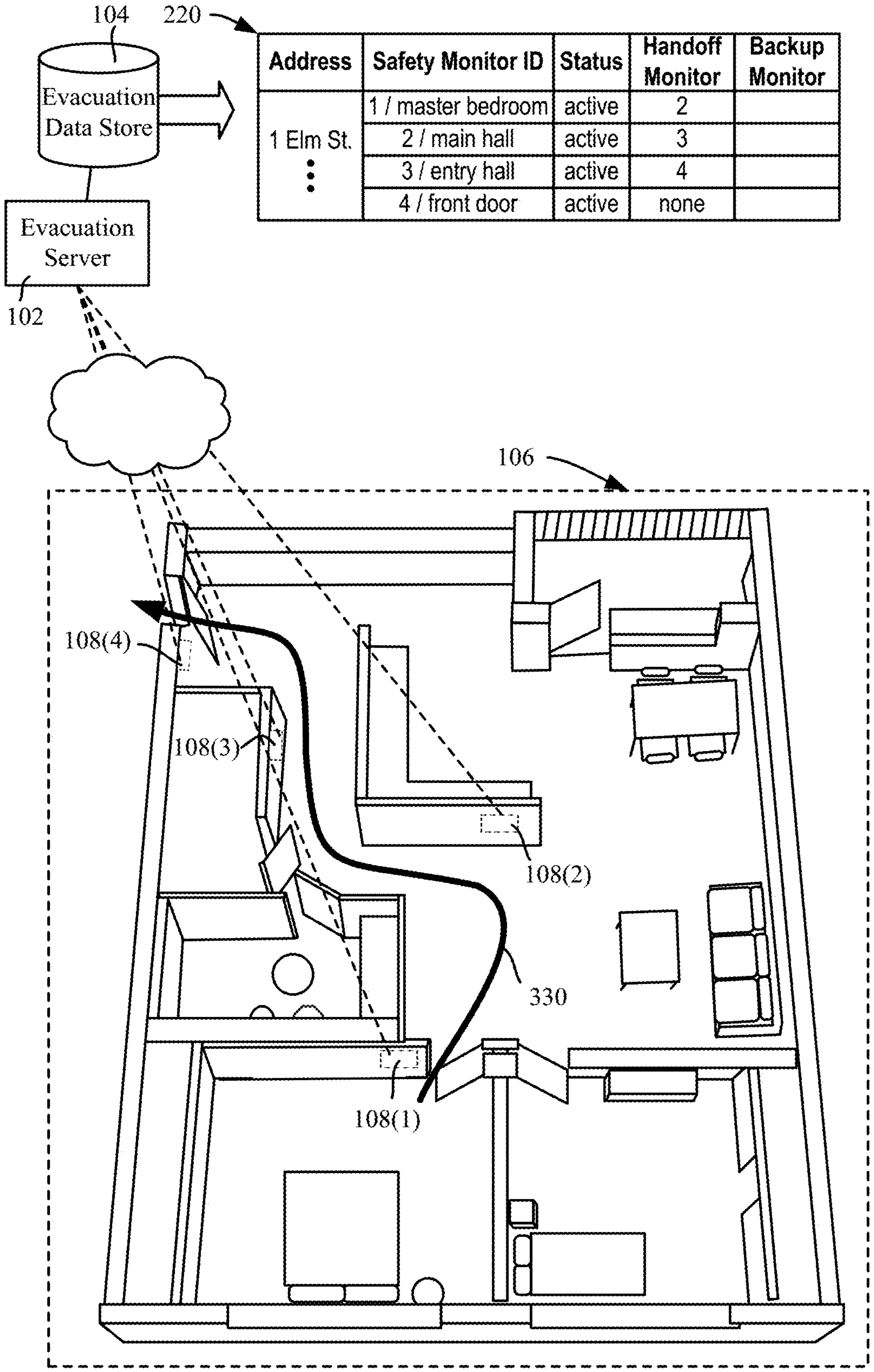
FIG. 3 a block diagram of an example system, and example representation showing a determined evacuation route, in accordance with various aspects and embodiments of the subject disclosure.

As shown via the "Handoff Monitor" field in the example data structure 220 of FIG. 2, one or more evacuation routes may be established and stored in the data store 104 by virtue of defining a point-to-point listing, for each safety monitor, of which monitor is next in line along the route. For example, for the evacuation route shown in FIG. 3 by the dark, curved arrow labeled 330, based on the "Handoff Monitor" field, the monitor 108(1) hands off to the monitor 108(2), which in turn hands off to the monitor 108(3), which hands off to the monitor 108(4). As described herein, the occupant is guided from one monitor location to a next monitor location, such as by audible commands.

Figure 4:
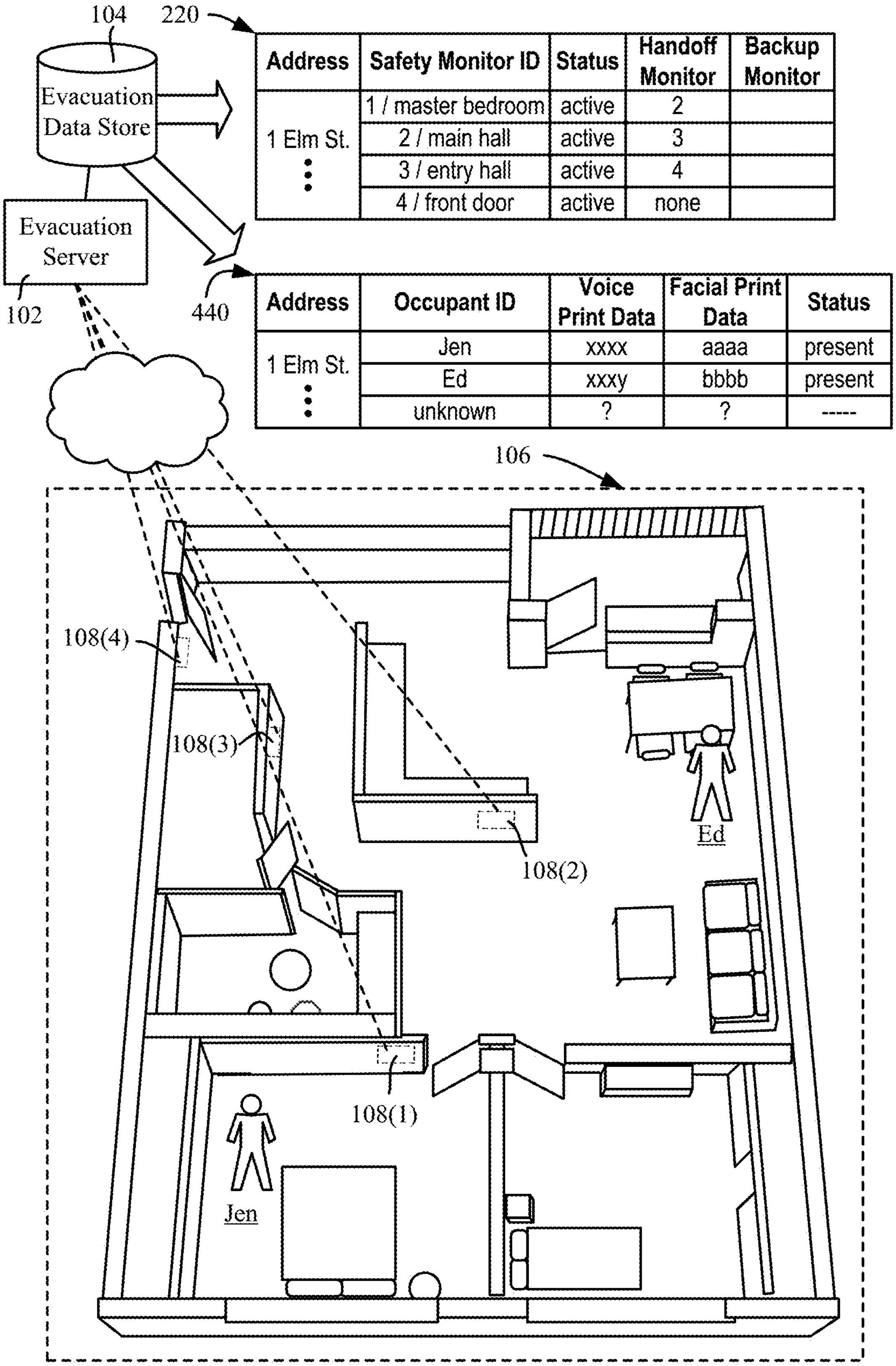
FIG. 4 is a block diagram of an example system, example representation and example occupant registration data structure, in accordance with various aspects and embodiments of the subject disclosure.

Occupants, e.g. regular occupants such as family members, also may register their identities. To this end, as shown in FIG. 4 there also may exist a data structure 440 of occupants of the area, such as residents of the house. Each occupant may be registered in the data structure 440, which may be contained as a part of the evacuation data store 104 (e.g., a different set of records in the same data store 104, as in FIG. 4)), or in a separate data store.

For each occupant, one or more biometric identifiers may be generated based on a capture of their biometric data at one of the safety monitors using cameras, microphones, or other sensors on the monitor or device(s) coupled thereto. For example, the residents "Jen" and "Ed" may input spoken utterances and images to a safety monitor or device coupled thereto that may be used to generate a voice print and a facial print, as well as silhouette prints, gait prints, and/or other biometric identifiers (e.g. their heights if sufficiently different and stable) that may be used to uniquely identify each occupant. It is also feasible to register such information independent of any particular safety monitor/area, whereby, for example, a safety monitor at work and a different safety monitor at home will both recognize the same person/occupant when present, via the information in a multiple-area data structure similar to or copied from the data structure 440.

The safety monitors 108(1)-108(4) thus may be used to detect the presence of the occupants within the area. For example, when an occupant enters the door at safety monitor 108(4), the safety monitor 108(4) may detect the occupant's facial features, voice, gait, silhouette, or other features so that the safety monitor 108(4) may detect the presence of the occupant in the area 106 without requiring the occupant to have any sort of communication device or provide any manual input. Anything spoken by the occupant can be matched with voice data so the occupant can be secondarily recognized as present. Upon detecting an occupant at the safety monitor 108(4), the occupant may be registered (e.g., in the status field of the occupant data store 440) as being present within the area; exiting the area 106 may be similarly detected. In such a way, the safety monitors 108(1)-108(4) within the area have access to knowledge of which occupants are present within the area at a given time.

Figure 5:
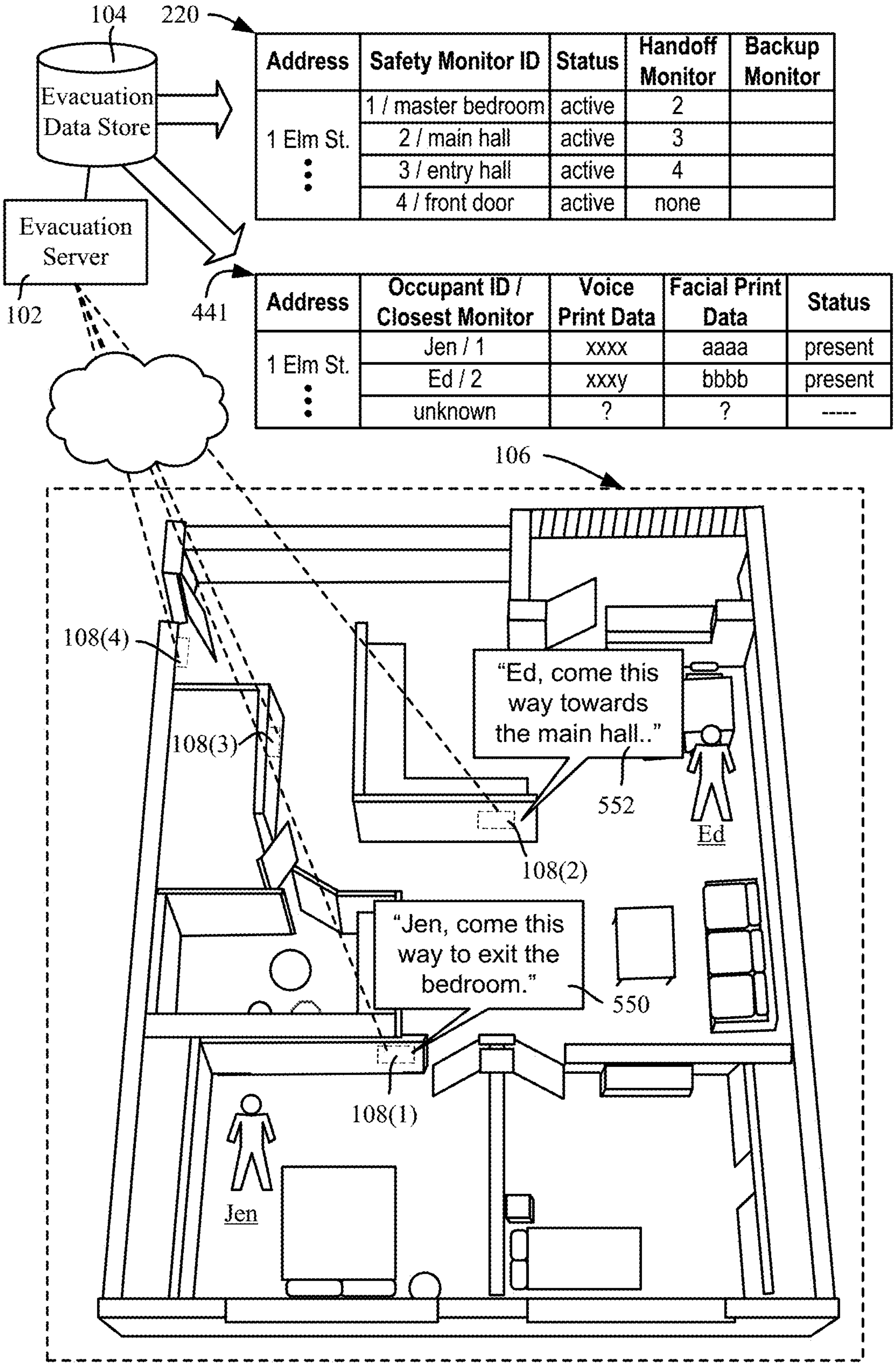
FIG. 5 is a block diagram of an example system, and example representation showing a determined evacuation route with personalized audio or other guidance to occupants based on their current locations in a structure, in accordance with various aspects and embodiments of the subject disclosure.

While the occupants are present within the area, the safety monitors may periodically detect their presence within the proximity of each monitor. As such, the safety monitors may maintain knowledge to which monitor each occupant is closest at any given point in time. With this knowledge, e.g., as shown in the updated data structure 441 of FIG. 5, the safety monitors 108(1)-108(4) know which monitor to use for each occupant as the beginning of his or her evacuation route if one is needed. For example, as shown in FIG. 5, because Jen is closest to the safety monitor 108(1), at the time of the detection of the need for an evacuation, the safety monitor 108(1) will be used as the beginning point of her evacuation route. Likewise, Ed may be detected as closest to the safety monitor 108(2) should an evacuation event occur at this time.

Turning to detection of an evacuation event, the need for the execution of evacuation routes may be detected by one or more of the safety monitors 108(1)-108(4) using their sensors, or may be detected by another sensor within the area or external to the area. In any case, an alert is sent to the evacuation server 102, and when received, the evacuation server 102 begins the execution of the assisted event evacuation route procedure. In this example, the evacuation server 102 accesses the data structure 441 and appropriately sends a message to the safety monitor 108(1) to initiate Jen to use her evacuation route, and a similar message to the safety monitor 108(2) to initiate an evacuation route for Ed.

The safety monitors 108(1) and 108(2) may respond to the message by outputting spoken instructions to Jen and Ed, respectively, to direct them towards the most suitable evacuation route for each. The instructions may be customized, personalized for each, such as by stating their names as represented by the blocks 550 and 552 of FIG. 5. As an option, which may be useful for unrecognized occupant(s) such as a visitor or for groups, the safety monitors 108(1)-108(4) may use directional speakers to direct their audio output towards each of their intended occupant(s) so as to direct the audio only specifically in the direction of each appropriate occupant.

As set forth above, flashing lights and the like may be used, which can help guide hearing impaired people who cannot necessarily appropriately hear the audio. In the event that an occupant is currently using some device technology, such as wearing smart glasses, wearing a virtual reality device, interacting with a smartphone, computing device or the like, the safety monitors 108(1)-108(4) may output supplemental evacuation information via such device(s).

Figure 6:
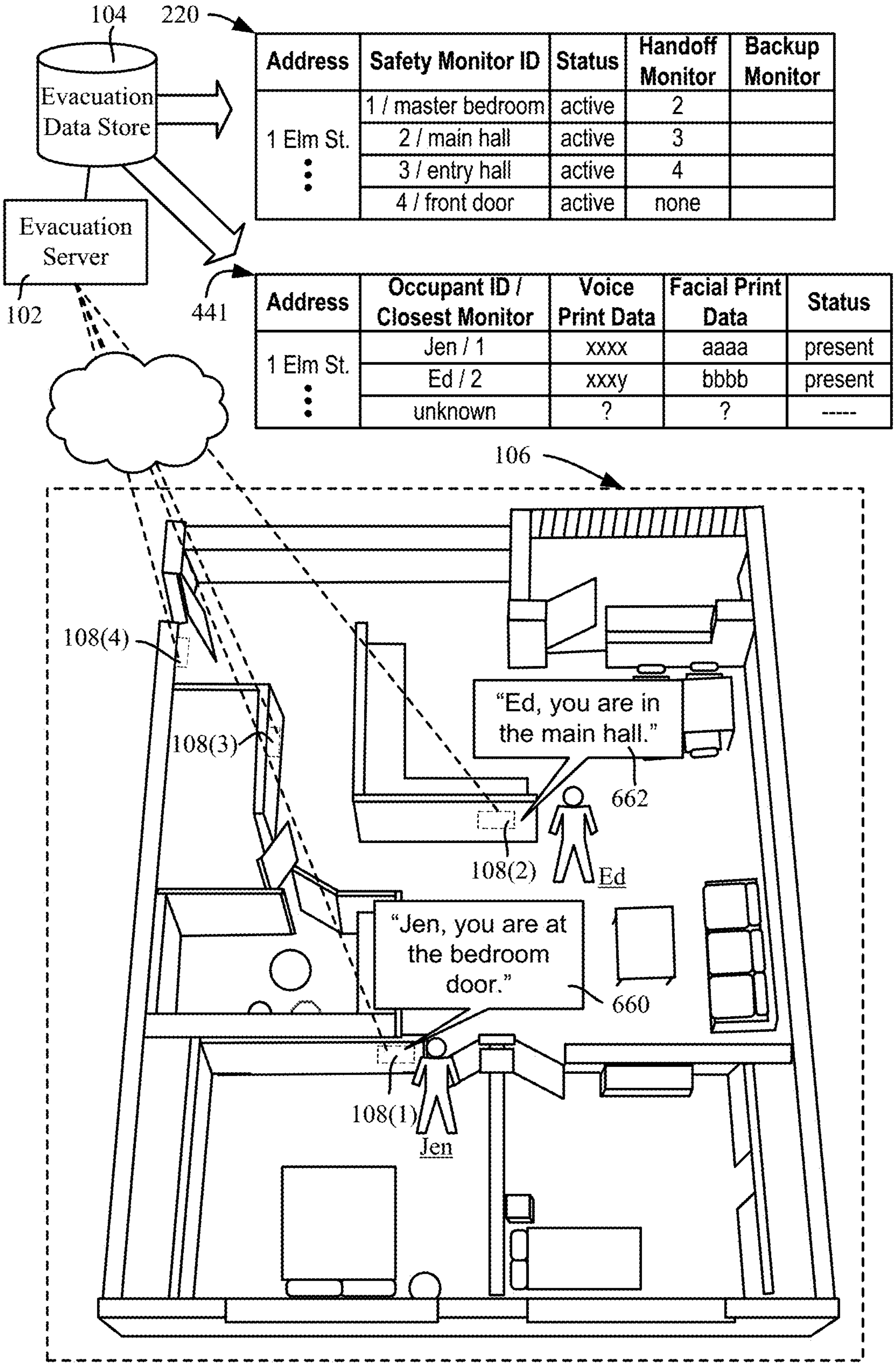
FIG. 6 is a block diagram of an example system, and example representation showing location-related updates along the evacuation route via personalized audio or other guidance to occupants based on their updated locations, in accordance with various aspects and embodiments of the subject disclosure.

Returning to audio-based evacuation, as shown in FIG. 6 via the blocks 660 and 662 and the changed locations with the area 106 of Jen and Ed, respectively, when the respective occupants reach their first respective waypoint safety monitor, that safety monitor may optionally inform the occupants of the current location, and potentially describe the occupant's next waypoint along the evaluation route. In any event, the monitor notifies the next monitor along the evacuation route for each user of the handoff. As set forth herein, the next handoff monitor's ID is retrieved from the evacuation data structure 220.

Note that more specific guidance may be output, such as "Ed take two steps away from the kitchen, then take four to your left." Updates can be provided to the instructions, e.g., "only two steps more forward to go," and so on.

Figure 7:
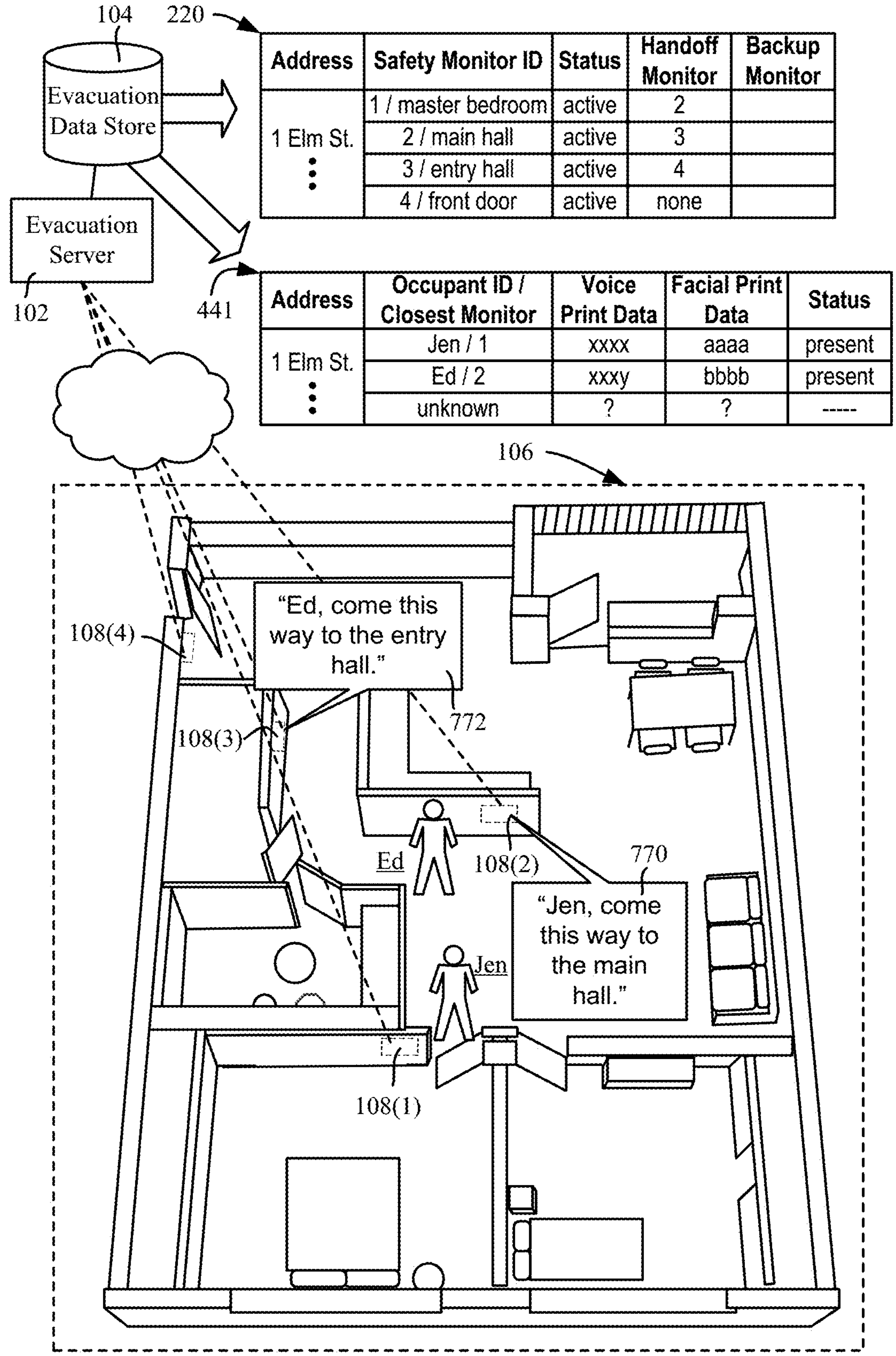
FIG. 7 is a block diagram of an example system, and example representation showing progress updates along the evacuation route via personalized audio or other guidance to occupants based on their updated locations, in accordance with various aspects and embodiments of the subject disclosure.

In a like manner, the next monitor along the evacuation route for each occupied continues the handoffs until each occupant is directed to the destination exit. In the example of FIG. 7, as the occupants move and are detected by at least one of the safety monitors, the monitor 108(2) takes over the instructions for Jen, as shown via block 770, and the monitor 108(3) takes over the instructions for Ed, as shown via block 772. One safety monitor can output instructions for multiple occupants; for example, if Ed has not yet reached the safety monitor 108(2), but Jen is detected by the safety monitor 108(2) as approaching, the safety monitor 108(2) can output instructions to both.

Figure 8:
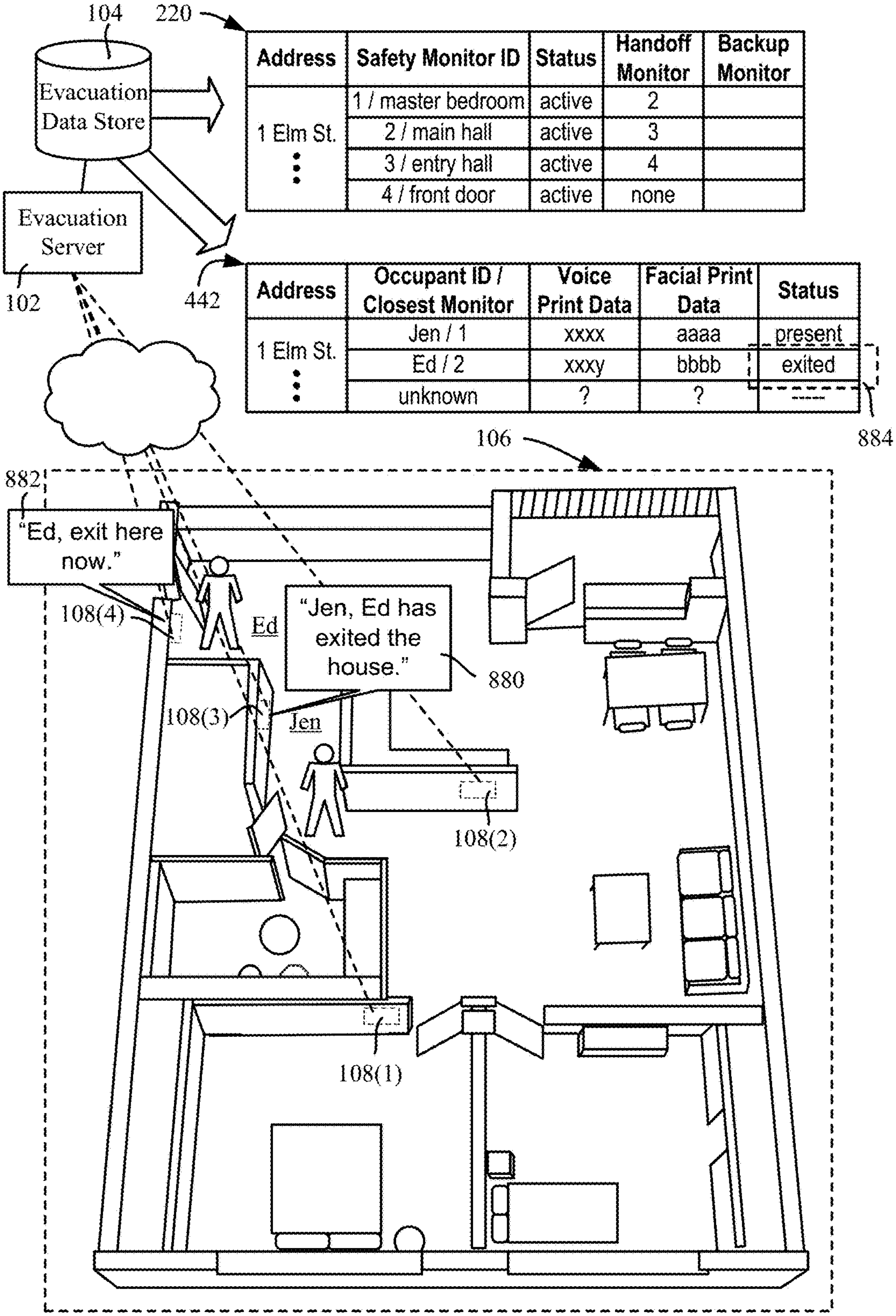
FIG. 8 is a block diagram of an example system, and example representation showing the updating of one occupant's evacuation status to another occupant, in accordance with various aspects and embodiments of the subject disclosure.

When an occupant reaches an exit point, the monitor at the exit point (e.g., the safety monitor 108(4)), may detect the exit for the occupant (occurring just after the instruction at block 882 of FIG. 8) and register that that occupant's status has changed from "present" to "exited" as shown via the dashed block 884 in the updated data structure 442 of FIG. 8. Optionally, when one occupant exits the area, other occupant(s) may be informed of the exit by their nearest monitor, e.g., as represented by the block 880 in FIG. 8. Multiple monitors may broadcast such information as well. Note that relevant status information may be provided along the way, e.g., "Jen, do not go look for Ed, as he is ahead of you approaching the exit" and "Ed, do not go back and look for Jen, as she is following her appropriate evacuation route." Similarly, the technology can be applied to give status updates on non-occupants. For example, a monitor that knows who is present and not present can output advice such as "don't go back to look for the dog, Joe took Fido for a walk and they are not in the apartment."

Figure 9:
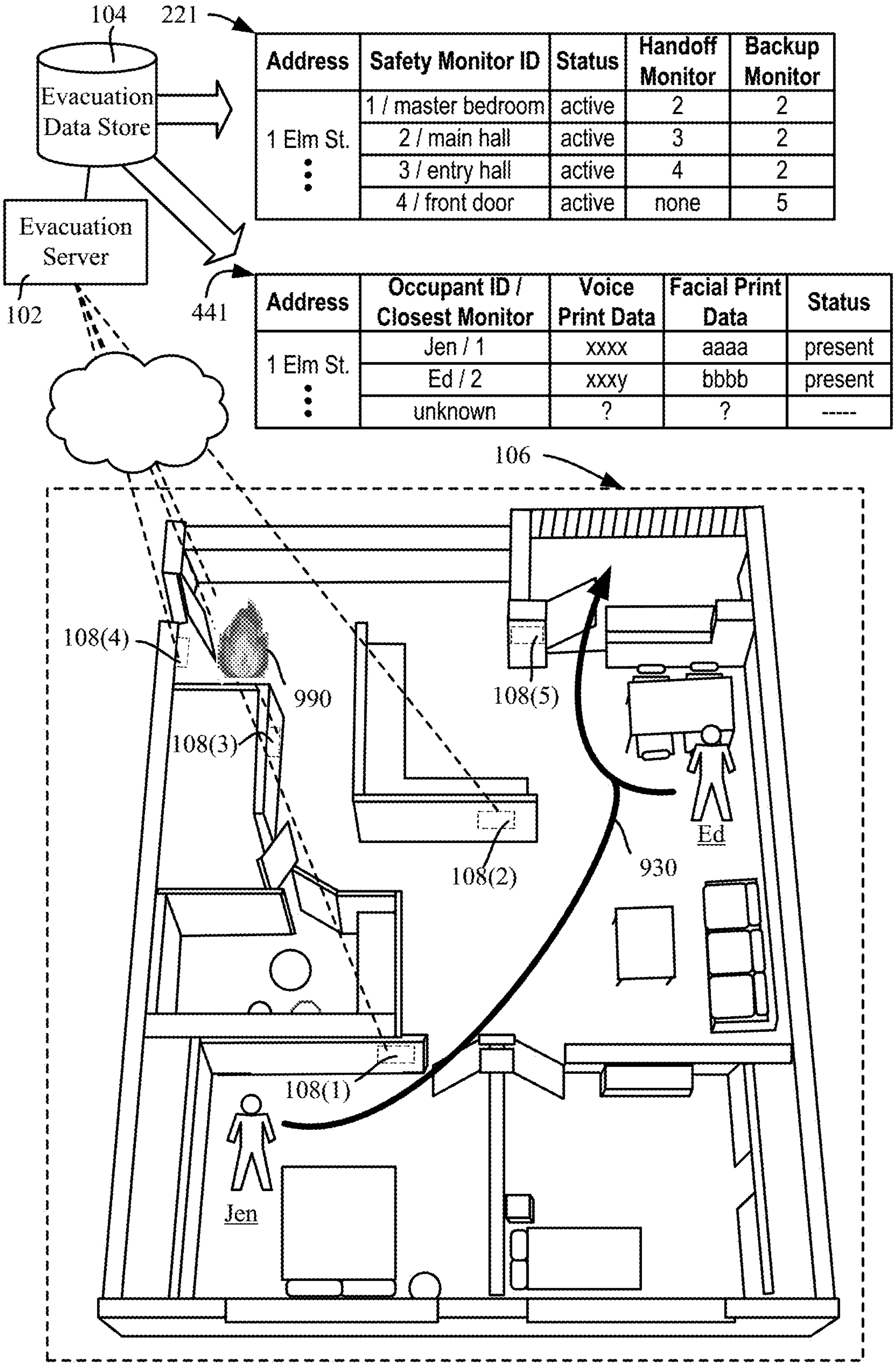
FIG. 9 is a block diagram of an example system and example representation showing an alternate determined evacuation route, in accordance with various aspects and embodiments of the subject disclosure.

One or more back up evacuation routes may be stored by virtue of indicating backup handoff monitors for each safety monitor, as shown in the modified data structure 221 in FIG. 9. For example, safety monitors 3 and 4 may not be operative or they may detect that they are the location of the source of emergency, e.g., represented by the "fire" image 990 proximate the monitor 108(4) in FIG. 9. Similar circumstances may exist such that an evacuation route via the monitors 108(3) and 108(4) is not safe. In this case, for example, safety monitor 108(5) may serve as a backup route, and occupants may be directed through such a backup route accordingly, e.g., as represented by the dark curved arrows labeled 930 in FIG. 9.

Figure 10:
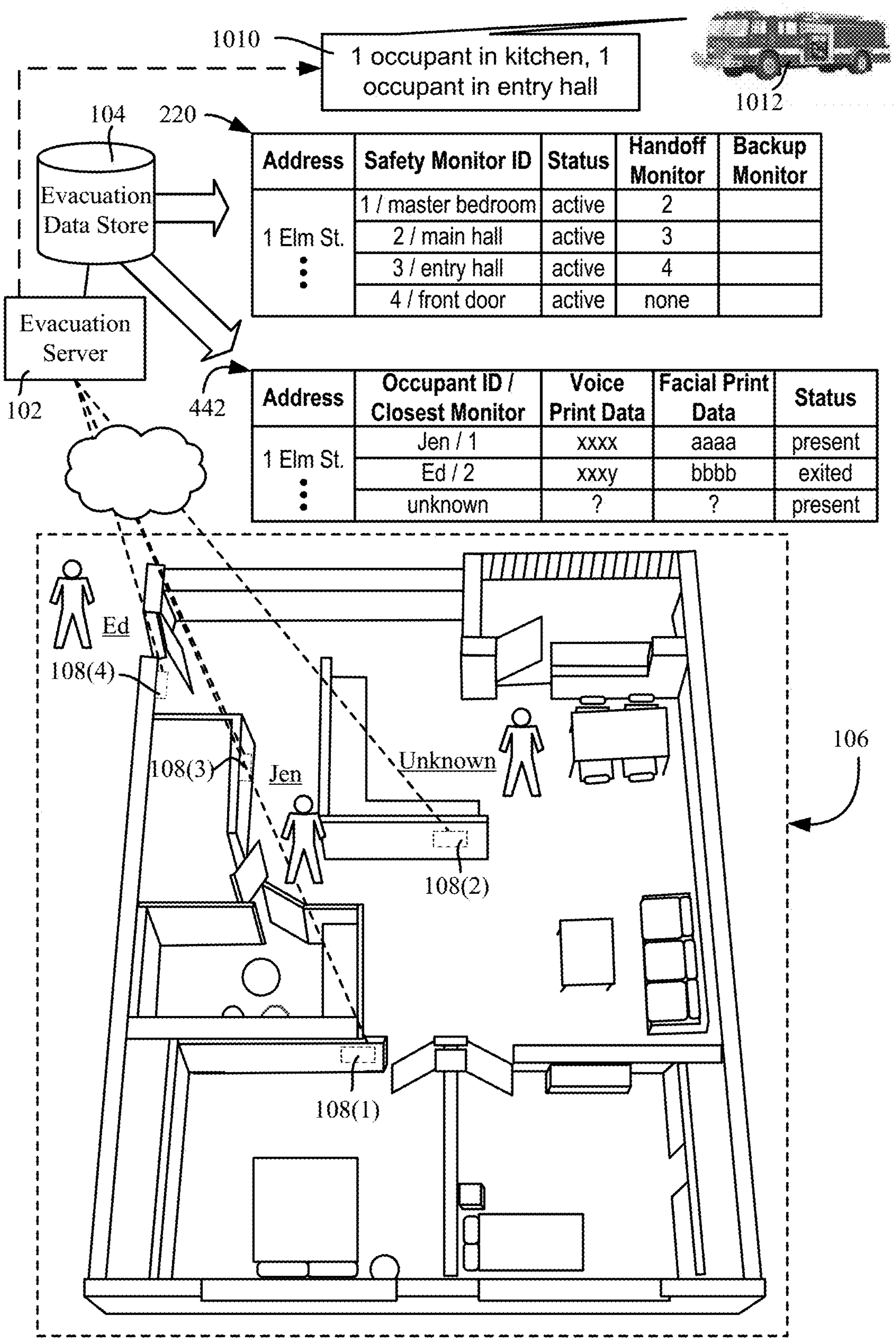
FIG. 10 is a block diagram of an example system, and example representation showing occupants' locations reported to a responding entity, in accordance with various aspects and embodiments of the subject disclosure.

The evacuation server 102 may also share data from the evacuation data store 104 with first responders, such as directly or via a responder command center. For example, the evacuation server 102 may regularly analyze the data from the evacuation data store 104 and send updated reports indicating the status and location (based on last nearest monitor for each occupant). This is represented in FIG. 10 via block 1010 as output directly or indirectly to the firefighters (represented by the image 1012). Unknown occupants ("Unknown") may also be included in the evacuation plan as shown in FIG. 10. For example, if a visitor comes to the house, upon entry, his or her presence may be detected and may be registered in the evacuation data store 220 as an unknown occupant if they do not match a known biometric identity, and do not act to input such data.

The technology described herein also may be used in other embodiments and scenarios. For example, the technology described herein may be used to direct people who may be less familiar with the surroundings of an area. An evacuation route may be created by a command center and sent to the evacuation server 102, which may instruct the monitors (e.g., 108(1)-108(4)) to implement a route to direct first responders proximate the area to direct them to a particular location within the area, or towards an exit. The technology described herein may also be used to detect and direct groups of occupants within an area. For example, a basic motion sensor can detect the presence of one or more persons, and a monitor's audio can output something like "if you can hear this, walk towards the voice." Timing, directional audio and/or volume of multiple monitors can be pre-adjusted so that people only hear one monitor at a time based on their locations.

Figure 11:
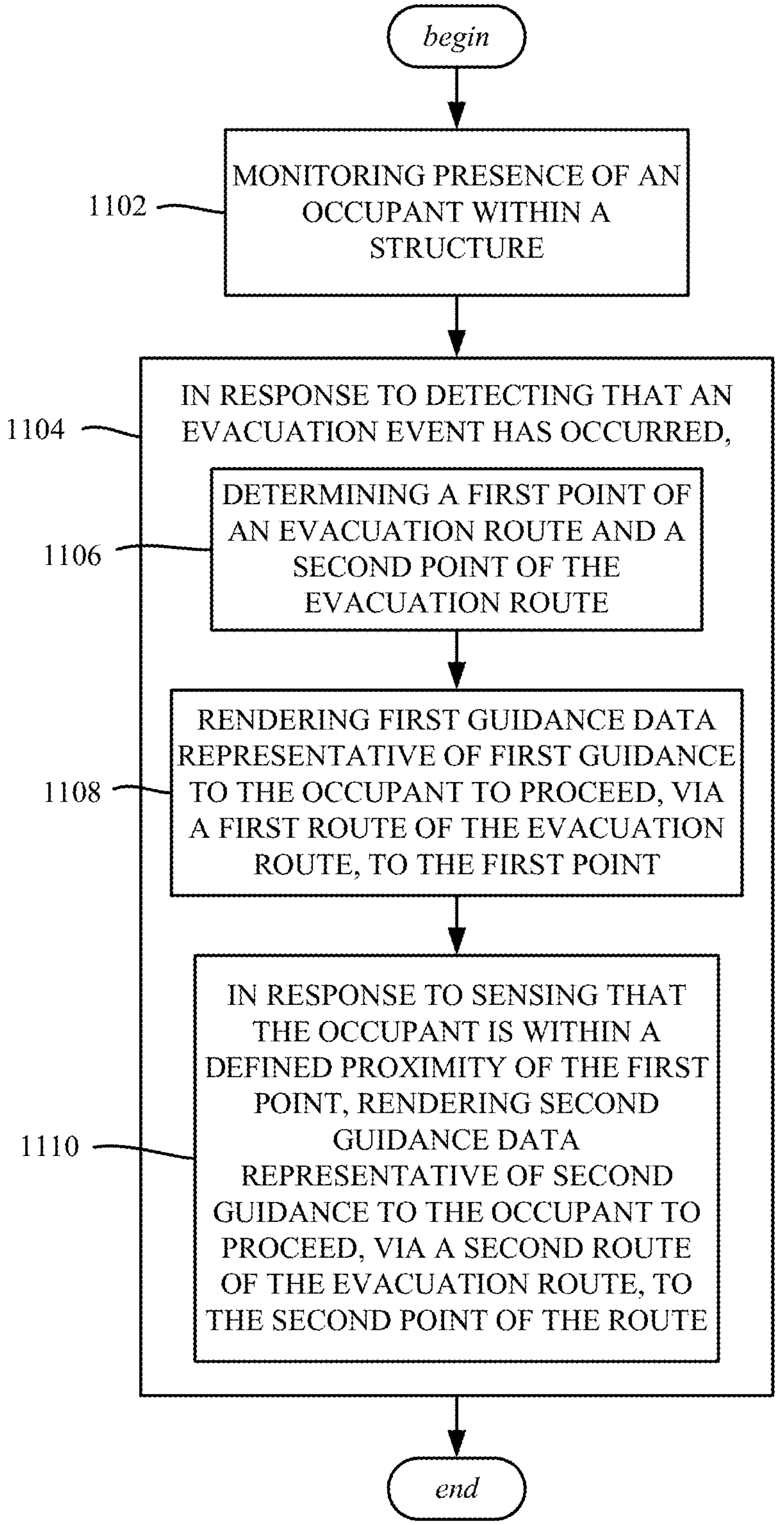
FIG. 11 is a flow diagram representing example operations related to rendering point-to-point guidance data along an evacuation route to an occupant, in accordance with various aspects and embodiments of the subject disclosure.

One or more example aspects are represented in FIG. 11, and can correspond to a system, including a processor, and a memory that stores executable instructions that, when executed by the processor, facilitate performance of operations. Example operation 1102 represents monitoring presence of an occupant within a structure. Example operation 1104 represents, in response to detecting that an evacuation event has occurred, determining a first point of an evacuation route and a second point of the evacuation route (example operation 1106), rendering first guidance data representative of first guidance to the occupant to proceed, via a first route of the evacuation route, to the first point (example operation 1108), and in response to sensing that the occupant is within a defined proximity of the first point, rendering second guidance data representative of second guidance to the occupant to proceed, via a second route of the evacuation route, to the second point of the route (example operation 1110).

Monitoring the presence of the occupant can include detecting the occupant based on biometric data associated with a biometric corresponding to the occupant. Rendering at least one of the first guidance data or the second guidance data to the occupant can include rendering customized data to the occupant that has been customized for the occupant based on the biometric data of the occupant.

The occupant, being within a defined proximity of the first point can include the occupant being within a first defined proximity of the first point, and further operations can include determining that the occupant is within a specified area based on a second defined proximity of the occupant to the second point.

Determining the first point of the evacuation route can include selecting the first point of the evacuation route based on determining inaccessibility, by the occupant, to a candidate point of the evacuation route, and wherein the candidate point of the evacuation route is not the first point or the second point.

Further operations can include determining that a candidate point of the evacuation route is inaccessible to the occupant, and selecting the second point of the evacuation route in response to the determining that the candidate point of the evacuation route is inaccessible.

Rendering at least one of the first guidance data or the second guidance data to the occupant can include outputting audible data representative of at least one of the first guidance or the second guidance, respectively. Outputting the audible data can include outputting directional audio.

Further operations can include outputting progress data to a device of an entity other than the occupant, the progress data representing progress of the occupant along the evacuation route.

Further operations can include rendering third guidance data representative of third guidance to a responder to the evacuation event other than the occupant.

The occupant can be a first occupant, the second point can be proximate to an evacuation location, and further operations can include rendering third guidance data representative of third guidance to a second occupant to guide the second occupant to the second point.

Further operations can include detecting that the first occupant has reached the evacuation location, and, in response to the detecting that the first occupant has reached the evacuation location, outputting status information to a device of the second occupant indicating that the first occupant has reached the evacuation location. This can include outputting status information indicative of progress of the first occupant along the evacuation route to a responding entity.

Figure 12:
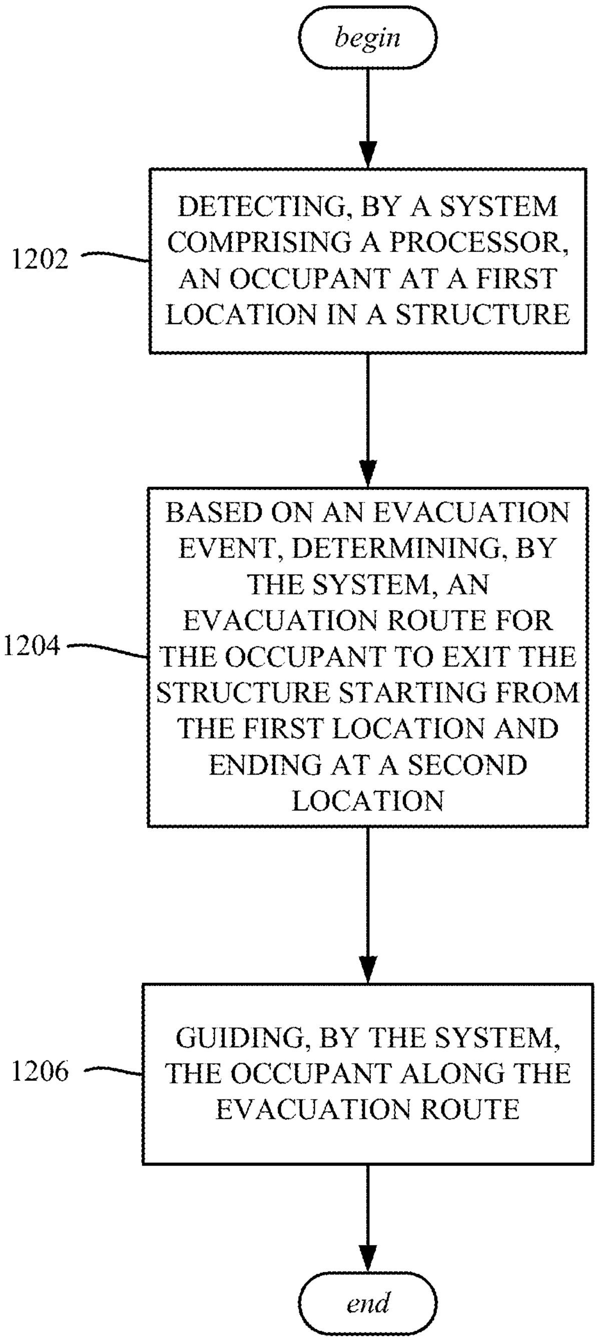
FIG. 12 is a flow diagram representing example operations related guiding an occupant an evacuation route based on an evacuation event, in accordance with various aspects and embodiments of the subject disclosure.

One or more example aspects are represented in FIG. 12, and, for example, can correspond to operations, such as of a method. Example operation 1202 represents detecting, by a system comprising a processor, an occupant at a first location in a structure. Example operation 1204 represents, based on an evacuation event, determining, by the system, an evacuation route for the occupant to exit the structure starting from the first location and ending at a second location. Example operation 1206 represents guiding, by the system, the occupant along the evacuation route.

Guiding the occupant along the evacuation route can include outputting first audible data via a first device at a first point along the first evacuation route, detecting that the occupant is proximate to the first point, and, in response to the detecting that the occupant is proximate to the first point, outputting second audible data via a second device at a second point along the evacuation route.

Further operations can include obtaining, by the system, biometric data applicable to the occupant; guiding of the occupant along the evacuation route can include outputting information to the occupant that is customized for the occupant based on the biometric data.

The occupant can be a first occupant, the evacuation route can be a first evacuation route, and further operations can include detecting, by the system, a second occupant at a third location in the structure, determining, by the system, a second evacuation route for the second occupant to exit the structure starting from the third location and ending at a fourth location, wherein the second evacuation route is different from the first evacuation route, and guiding, by the system, the second occupant along the second evacuation route.

Further operations can include guiding, by the system, a responder, responding to the evacuation event, to a point location within the structure to further facilitate guiding the occupant along the evacuation route.

Figure 13:
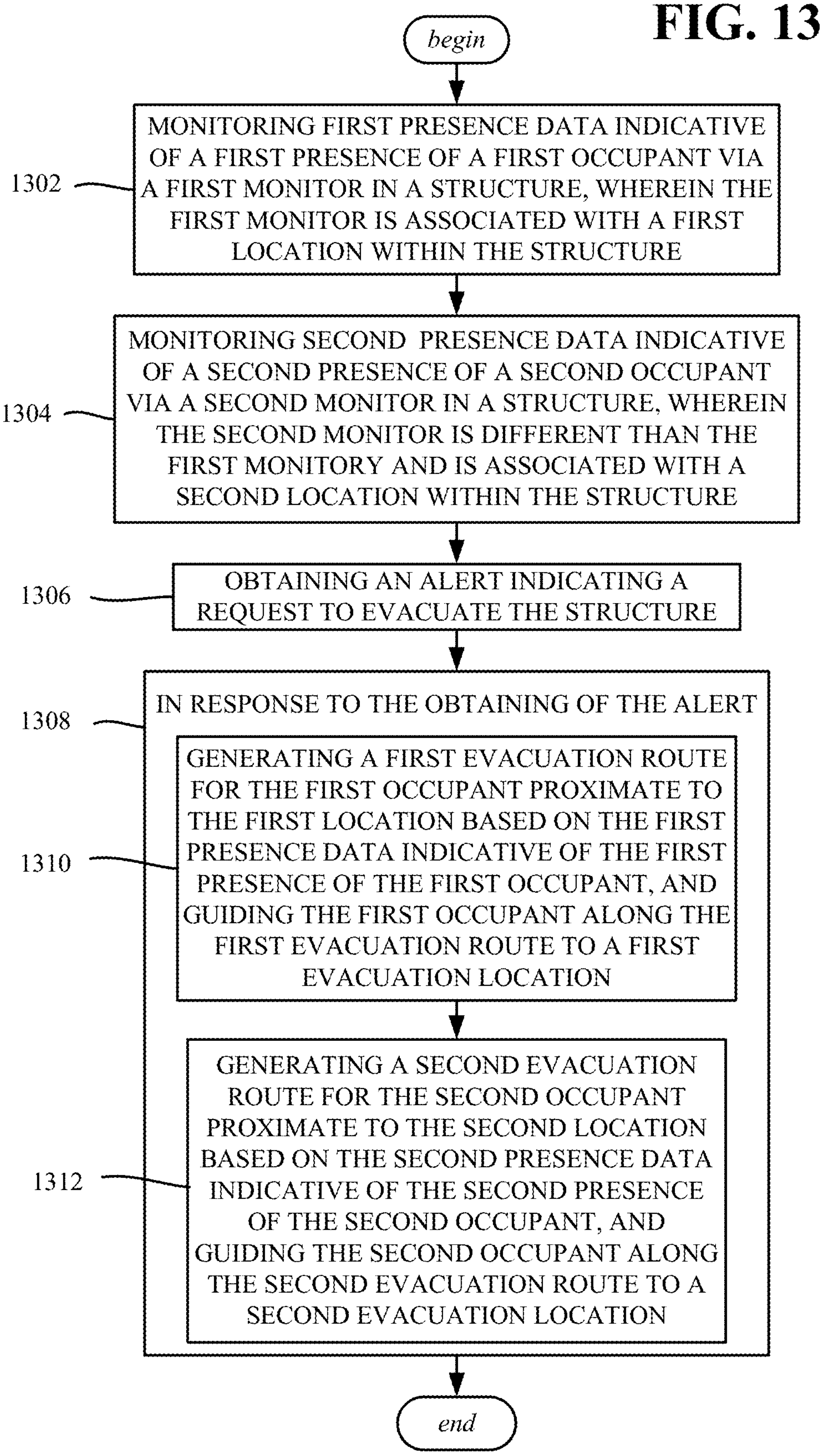
FIG. 13 is a flow diagram representing example operations related to generating first and second evacuation routes for first and second occupants, respectively, in accordance with various aspects and embodiments of the subject disclosure.

One or more aspects are represented in FIG. 13, such as implemented in a machine-readable medium, including executable instructions that, when executed by a processor, facilitate performance of operations. Example operation 1302 represents monitoring first presence data indicative of a first presence of a first occupant via a first monitor in a structure, wherein the first monitor is associated with a first location within the structure. Example operation 1304 represents monitoring second presence data indicative of a second presence of a second occupant via a second monitor in a structure, wherein the second monitor is different than the first monitory and is associated with a second location within the structure. Example operation 1306 represents obtaining an alert indicating a request to evacuate the structure. Example operation 1308 represents in response to the obtaining of the alert, generating a first evacuation route for the first occupant proximate to the first location based on the first presence data indicative of the first presence of the first occupant, and guiding the first occupant along the first evacuation route to a first evacuation location (example operation 1310), and generating a second evacuation route for the second occupant proximate to the second location based on the second presence data indicative of the second presence of the second occupant, and guiding the second occupant along the second evacuation route to a second evacuation location (example operation 1312).

Further operations can include obtaining biometric data representing a first biometric corresponding to the first occupant, matching the first occupant to identity data representative of an identity of the first occupant based on the biometric data, and wherein the guiding of the first occupant along the first evacuation route to the first evacuation location comprises outputting information to the first occupant that is customized for the first occupant based on the identity data.

Outputting the information to the first occupant that is customized for the first occupant based on the identity data can include outputting audio data to the first occupant based on the identity data, the audio data comprising specific name data representative of a name corresponding to the identity of the first occupant.

As can be seen, the technology described herein facilitates evacuation of a structure, such as corresponding to an area, by determining a point-to-point handoff route for occupants to follow to perform the evacuation, and guiding occupants of the area to follow the evacuation route. Via audio, the guidance can be used with occupants who may not have good visibility in the area. The evacuation route may be customized for each different occupant, e.g., by identifying the occupant (e.g., by name) as part of the guidance output. The technology described herein can apply in scenarios in which one or more the occupants do not have access to a device such as a smart phone or smart watch or other personal device that would otherwise perhaps permit them a guided evacuation.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) “multi-carrier system”, “multi-cell operation”, “multi-carrier operation”, “multi-carrier” transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification’s transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 14:
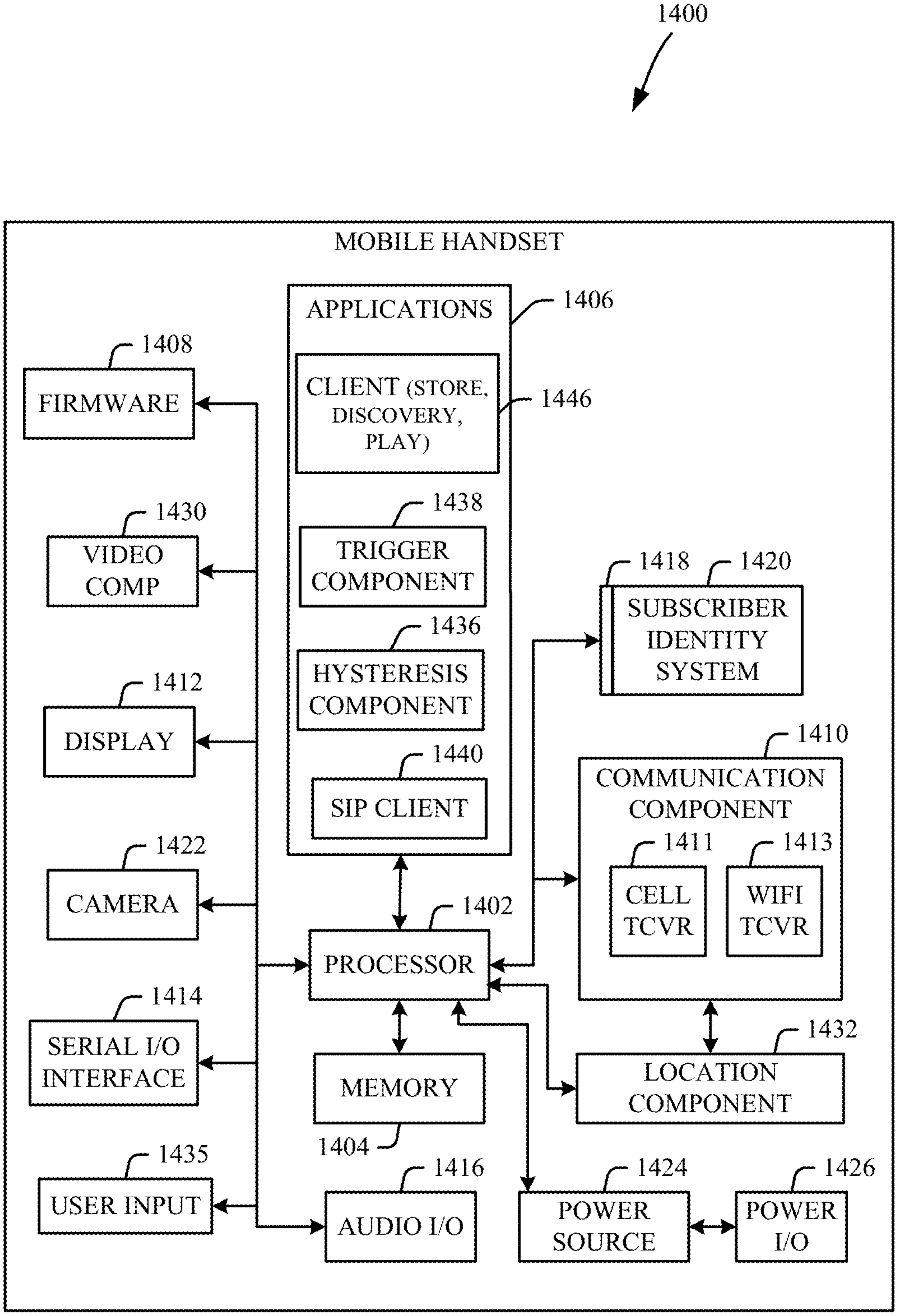
FIG. 14 illustrates an example block diagram of an example mobile handset operable to engage in a system architecture that facilitates wireless communications according to one or more embodiments described herein.

Referring now to FIG. 14, illustrated is a schematic block diagram of an example end-user device (such as user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
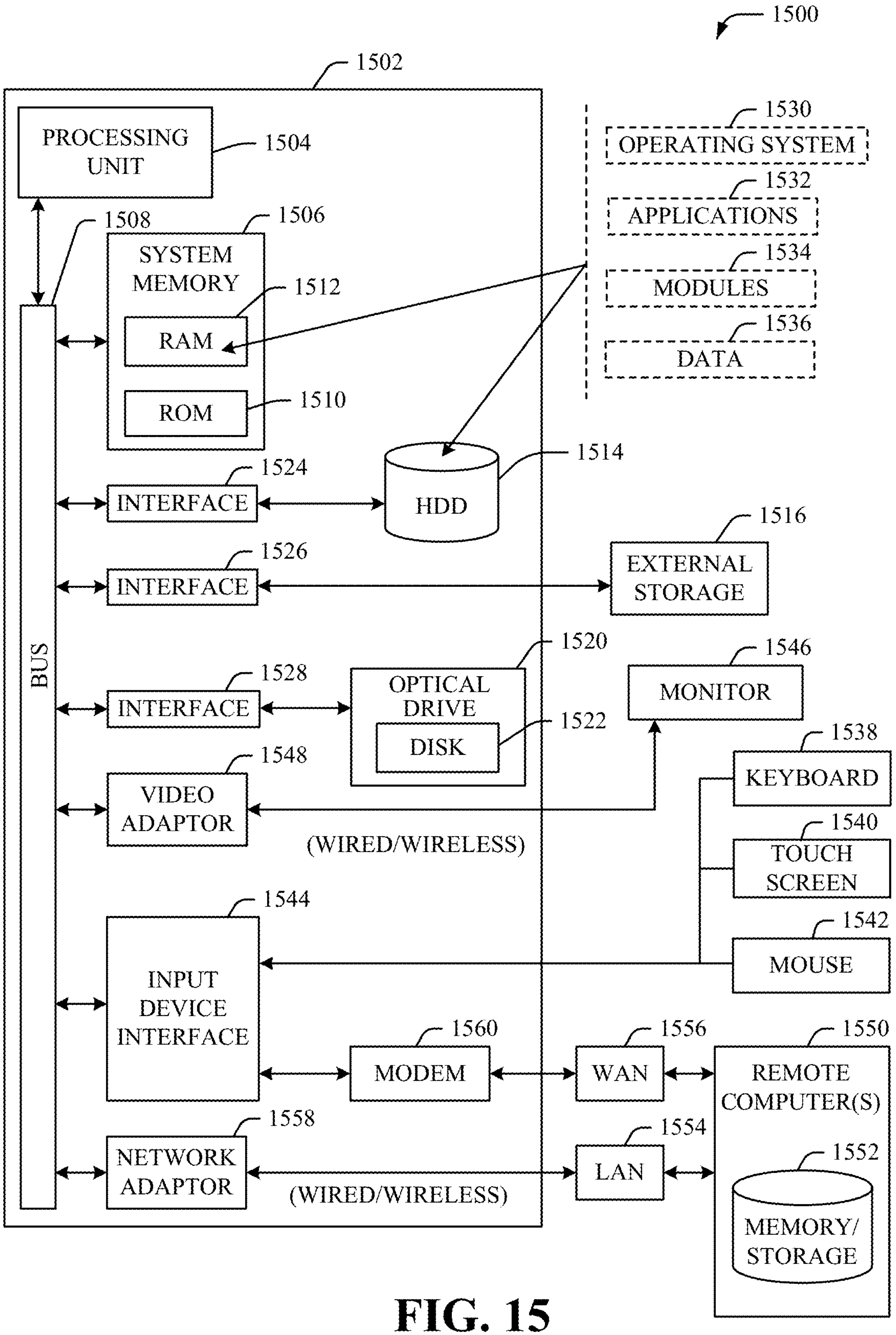
FIG. 15 illustrates an example block diagram of an example computer/machine system operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:

a processor; and a memory that stores executable instructions that, when executed by the processor of the system, facilitate performance of operations, the operations comprising:

monitoring presence of an occupant within a structure;

obtaining biometric data representing a biometric corresponding to the occupant;

matching the occupant to identity data representative of an identity of the occupant based on the biometric data;

in response to detecting that an evacuation event has occurred, determining a first point of an evacuation route and a second point of the evacuation route, rendering first guidance data representative of first guidance to the occupant to proceed, via a first route of the evacuation route, to the first point, wherein the rendering of the first guidance data comprises outputting information to the occupant that is customized for the occupant based on the identity data, and wherein the outputting of the information to the occupant that is customized for the occupant based on the identity data comprises outputting audio data to the occupant based on the identity data, the audio data comprising specific name data representative of a name corresponding to the identity of the occupant; and in response to sensing that the occupant is within a defined proximity of the first point, rendering second guidance data representative of second guidance to the occupant to proceed, via a second route of the evacuation route, to the second point of the evacuation route.

2. The system of claim 1, wherein the occupant being within a defined proximity of the first point comprises the occupant being within a first defined proximity of the first point, and wherein the operations further comprise determining that the occupant is within a specified area based on a second defined proximity of the occupant to the second point.

3. The system of claim 1, wherein the determining of the first point of the evacuation route comprises selecting the first point of the evacuation route based on determining an inaccessibility, by the occupant, to a candidate point of the evacuation route, and wherein the candidate point of the evacuation route is not the first point or the second point.

4. The system of claim 1, wherein the operations further comprise determining that a candidate point of the evacuation route is inaccessible to the occupant, and selecting the second point of the evacuation route in response to the determining that the candidate point of the evacuation route is inaccessible.

5. The system of claim 1, wherein the rendering of the second guidance data to the occupant comprises outputting audible data representative of the second guidance.

6. The system of claim 5, wherein the outputting of the audible data comprises outputting directional audio.

7. The system of claim 1, wherein the operations further comprise outputting progress data to a device of an entity other than the occupant, the progress data representing progress of the occupant along the evacuation route.

8. The system of claim 1, wherein the operations further comprise rendering third guidance data representative of third guidance to a responder to the evacuation event other than the occupant.

9. The system of claim 1, wherein the occupant is a first occupant, wherein the second point is proximate to an evacuation location, and wherein the operations further comprise rendering third guidance data representative of third guidance to a second occupant to guide the second occupant to the second point.

10. The system of claim 9, wherein the operations further comprise detecting that the first occupant has reached the evacuation location, and, in response to the detecting that the first occupant has reached the evacuation location, outputting status information to a device of the second occupant indicating that the first occupant has reached the evacuation location.

11. The system of claim 1, wherein the detecting that the evacuation event has occurred is based on an output of at least one safety monitor.

12. The system of claim 11, wherein the at least one safety monitor includes a plurality of safety monitors, and wherein the detecting that the evacuation event has occurred is based on a use of a respective sensor included in each safety monitor of the plurality of safety monitors.

13. The system of claim 1, wherein the rendering of the first guidance data utilizes smart glasses or a virtual reality device used by the occupant.

14. The system of claim 1, wherein the audio data further comprises second specific name data representative of a second name corresponding to a second identity of a second occupant.

15. The system of claim 14, wherein the audio data indicates that the second occupant is ahead of the occupant and is approaching an exit of the structure.

16. A method, comprising:

detecting, by a system comprising a processor, an occupant at a first location in a structure;

obtaining, by the system, biometric data representing a biometric corresponding to the occupant;

matching, by the system, the occupant to identity data representative of an identity of the occupant based on the biometric data;

based on an evacuation event, determining, by the system, an evacuation route for the occupant to exit the structure starting from the first location and ending at a second location; and guiding, by the system, the occupant along the evacuation route, wherein the guiding comprises outputting information to the occupant that is customized for the occupant based on the identity data, and wherein the outputting of the information to the occupant that is customized for the occupant based on the identity data comprises outputting audio data to the occupant based on the identity data, the audio data comprising specific name data representative of a name corresponding to the identity of the occupant.

17. The method of claim 16, wherein the guiding of the occupant along the evacuation route comprises outputting first audible data via a first device at a first point along the evacuation route, detecting that the occupant is proximate to the first point, and, in response to the detecting that the occupant is proximate to the first point, outputting second audible data via a second device at a second point along the evacuation route.

18. The method of claim 16, wherein the occupant is a first occupant, wherein the evacuation route is a first evacuation route, the method further comprising detecting, by the system, a second occupant at a third location in the structure, determining, by the system, a second evacuation route for the second occupant to exit the structure starting from the third location and ending at a fourth location, wherein the second evacuation route is different from the first evacuation route, and guiding, by the system, the second occupant along the second evacuation route.

19. The method of claim 16, further comprising guiding, by the system, a responder, responding to the evacuation event, to a point location within the structure to further facilitate guiding the occupant along the evacuation route.

20. A non-transitory machine-readable medium, comprising executable instructions that, when executed by a processor, facilitate performance of operations, the operations comprising:

monitoring first presence data indicative of a first presence of a first occupant via a first monitor in a structure, wherein the first monitor is associated with a first location within the structure;

monitoring second presence data indicative of a second presence of a second occupant via a second monitor in the structure, wherein the second monitor is different than the first monitor and is associated with a second location within the structure;

obtaining biometric data representing a first biometric corresponding to the first occupant;

matching the first occupant to identity data representative of an identity of the first occupant based on the biometric data;

obtaining an alert indicating a request to evacuate the structure; and in response to the obtaining of the alert, generating a first evacuation route for the first occupant proximate to the first location based on the first presence data indicative of the first presence of the first occupant, and guiding the first occupant along the first evacuation route to a first evacuation location, wherein the guiding of the first occupant along the first evacuation route to the first evacuation location comprises outputting information to the first occupant that is customized for the first occupant based on the identity data, and wherein the outputting of the information to the first occupant that is customized for the first occupant based on the identity data comprises outputting audio data to the first occupant based on the identity data, the audio data comprising specific name data representative of a name corresponding to the identity of the first occupant, and generating a second evacuation route for the second occupant proximate to the second location based on the second presence data indicative of the second presence of the second occupant, and guiding the second occupant along the second evacuation route to a second evacuation location.

* * * * *